(12) United States Patent
Smith

(10) Patent No.: US 9,329,018 B1
(45) Date of Patent: May 3, 2016

(54) FLATNESS INSPECTION SPIDER

(71) Applicant: MERIDIAN EQUIPMENT, INC., Houston, TX (US)

(72) Inventor: Jeffery A. Smith, Houston, TX (US)

(73) Assignee: MERIDIAN EQUIPMENT, INC., Houston, TX (US)

( * ) Notice: Subject to any disclaimer, the term of this patent is extended or adjusted under 35 U.S.C. 154(b) by 0 days.

(21) Appl. No.: 15/005,921

(22) Filed: Jan. 25, 2016

Related U.S. Application Data

(60) Provisional application No. 62/136,013, filed on Mar. 20, 2015.

(51) Int. Cl.
 *G01B 5/28* (2006.01)
 *G01B 5/20* (2006.01)

(52) U.S. Cl.
 CPC . *G01B 5/285* (2013.01); *G01B 5/20* (2013.01)

(58) Field of Classification Search
 CPC .................................. G01B 5/285; G01B 5/20
 USPC ............................................................ 33/533
 See application file for complete search history.

(56) References Cited

U.S. PATENT DOCUMENTS

| | | | | | |
|---|---|---|---|---|---|
| 2,965,970 | A * | 12/1960 | Rocheleau | ........... | G01B 5/0002 33/832 |
| 3,939,569 | A * | 2/1976 | Squires | ................ | G01B 5/0004 33/533 |
| 4,251,922 | A * | 2/1981 | Perlotto | ............. | B23Q 17/2225 33/1 M |
| 4,439,925 | A * | 4/1984 | Lock | ......................... | G01B 5/25 33/412 |
| 4,486,954 | A * | 12/1984 | Mock | ....................... | G01B 3/56 33/533 |
| 4,517,745 | A * | 5/1985 | Hare | ........................ | G01B 5/18 33/199 R |
| 5,454,170 | A * | 10/1995 | Cook | ..................... | B23Q 17/22 33/533 |
| 5,761,823 | A * | 6/1998 | Williamson, Jr. | ...... | G01B 5/285 248/904 |
| 6,519,865 | B1 * | 2/2003 | Yelverton | ............. | G01B 5/252 33/533 |
| 7,131,209 | B2 * | 11/2006 | Kim | ........................ | H01L 21/68 33/365 |
| 7,345,773 | B2 * | 3/2008 | Yano | .................... | G01B 11/306 33/533 |
| 8,997,365 | B2 * | 4/2015 | Alexander | ............... | G01B 5/25 33/412 |
| 2002/0059736 | A1 * | 5/2002 | Vencill | ................... | G01B 5/146 33/832 |

\* cited by examiner

*Primary Examiner* — Christopher Fulton
(74) *Attorney, Agent, or Firm* — Buskop Law Group, PC; Wendy Buskop

(57) ABSTRACT

A flatness inspection spider with a head assembly with a fixed base and a bearing assembly secured to the fixed base. A rotating inspection head is disposed over the bearing assembly. A load displacement shaft extends through an alignment head, fixed base, bearing assembly, and the rotating inspection head. At least one adjustable foot can extend from the fixed base to contact an inspection surface, wherein the at least one adjustable foot has a foot longitudinal axis, and wherein the at least one adjustable foot can extend or retract in length by rotating without the need for any additional tools. An inspection tubular is mounted through the rotating inspection head having a tubular longitudinal axis and an indicator mounted to the inspection tubular.

18 Claims, 9 Drawing Sheets

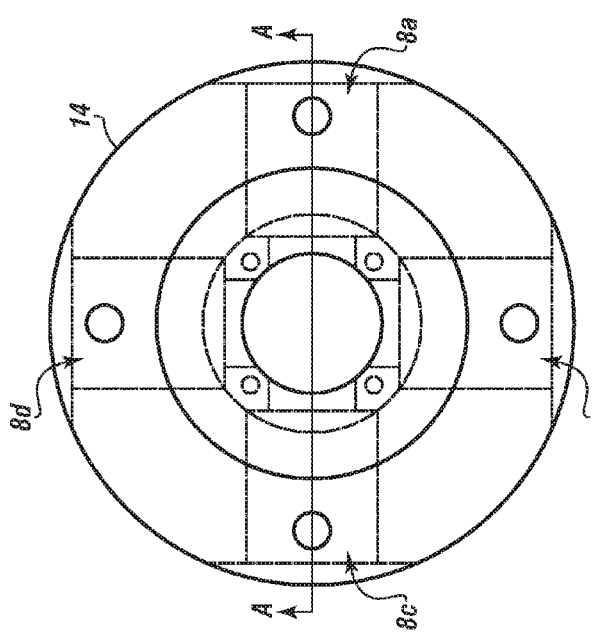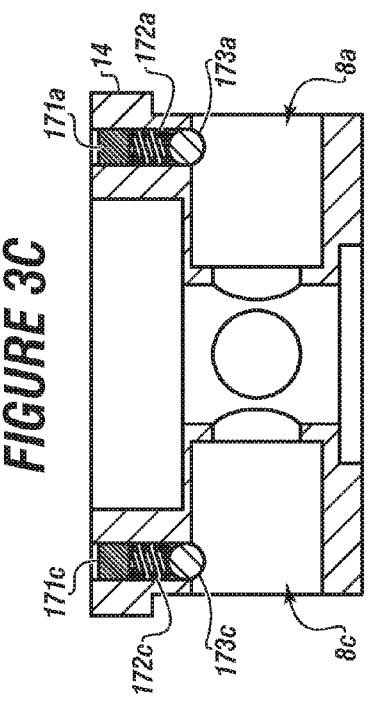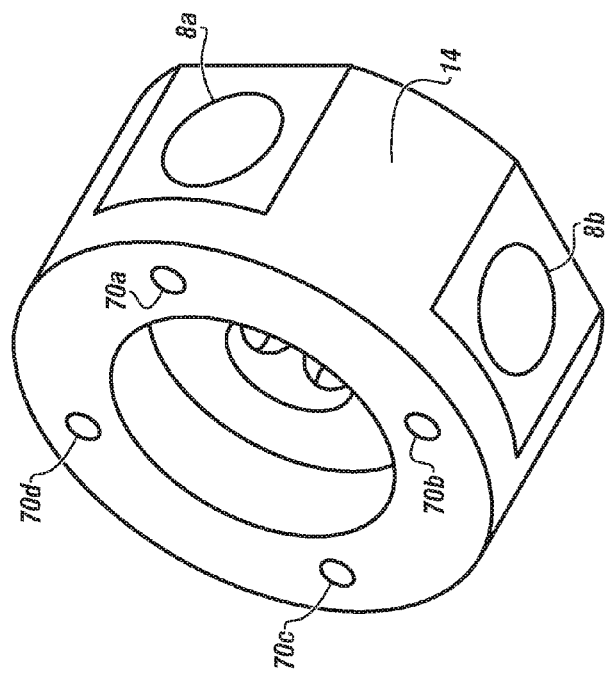

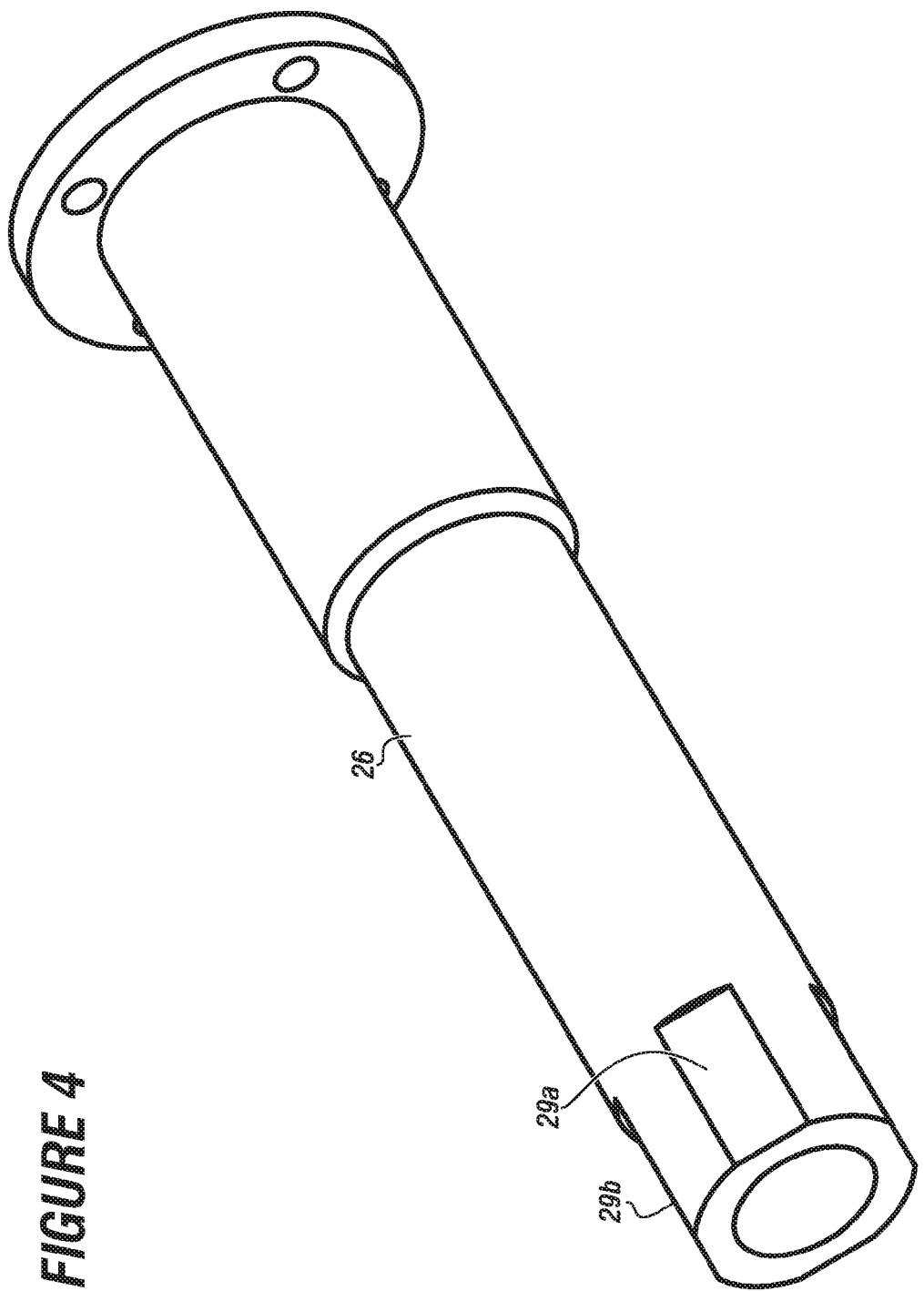

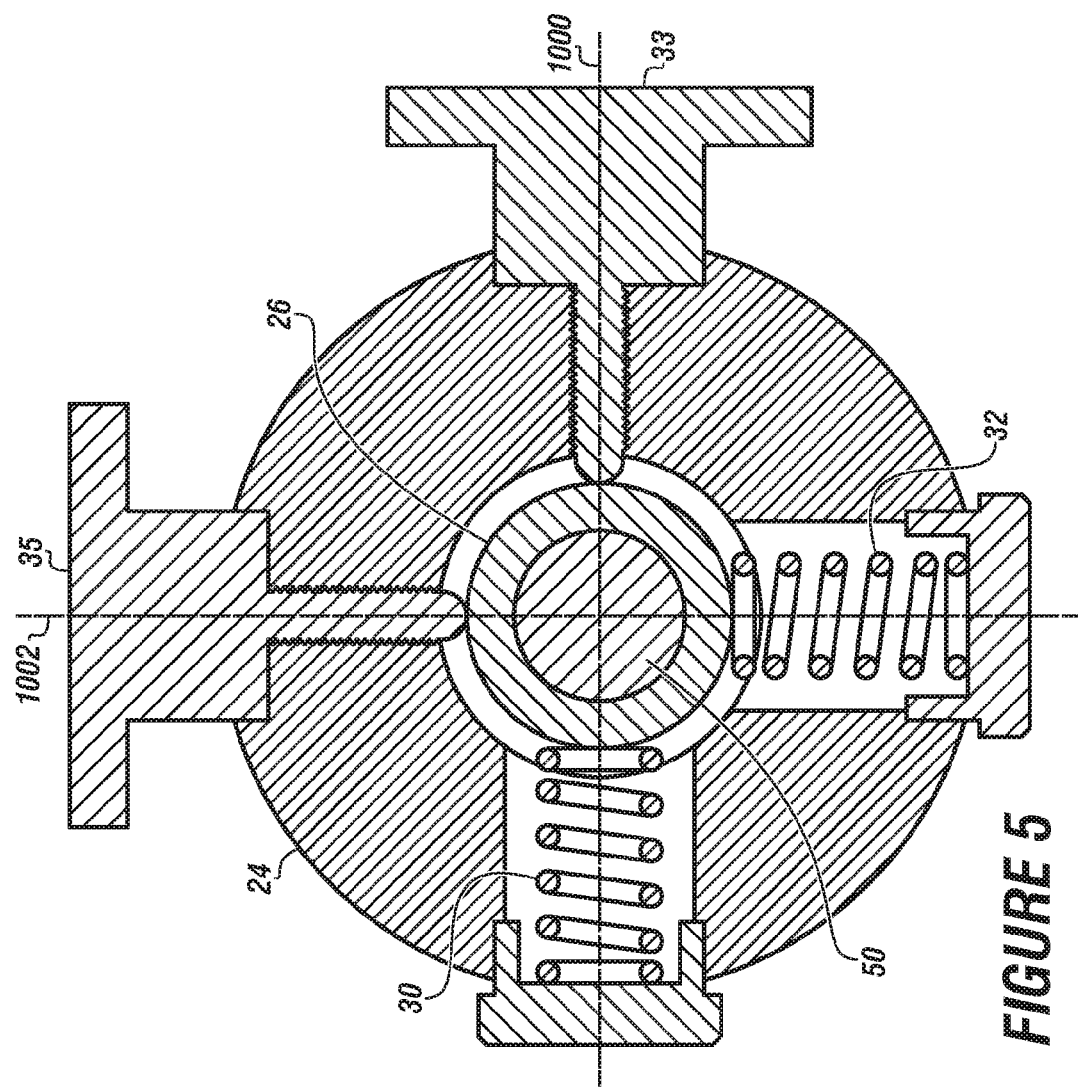

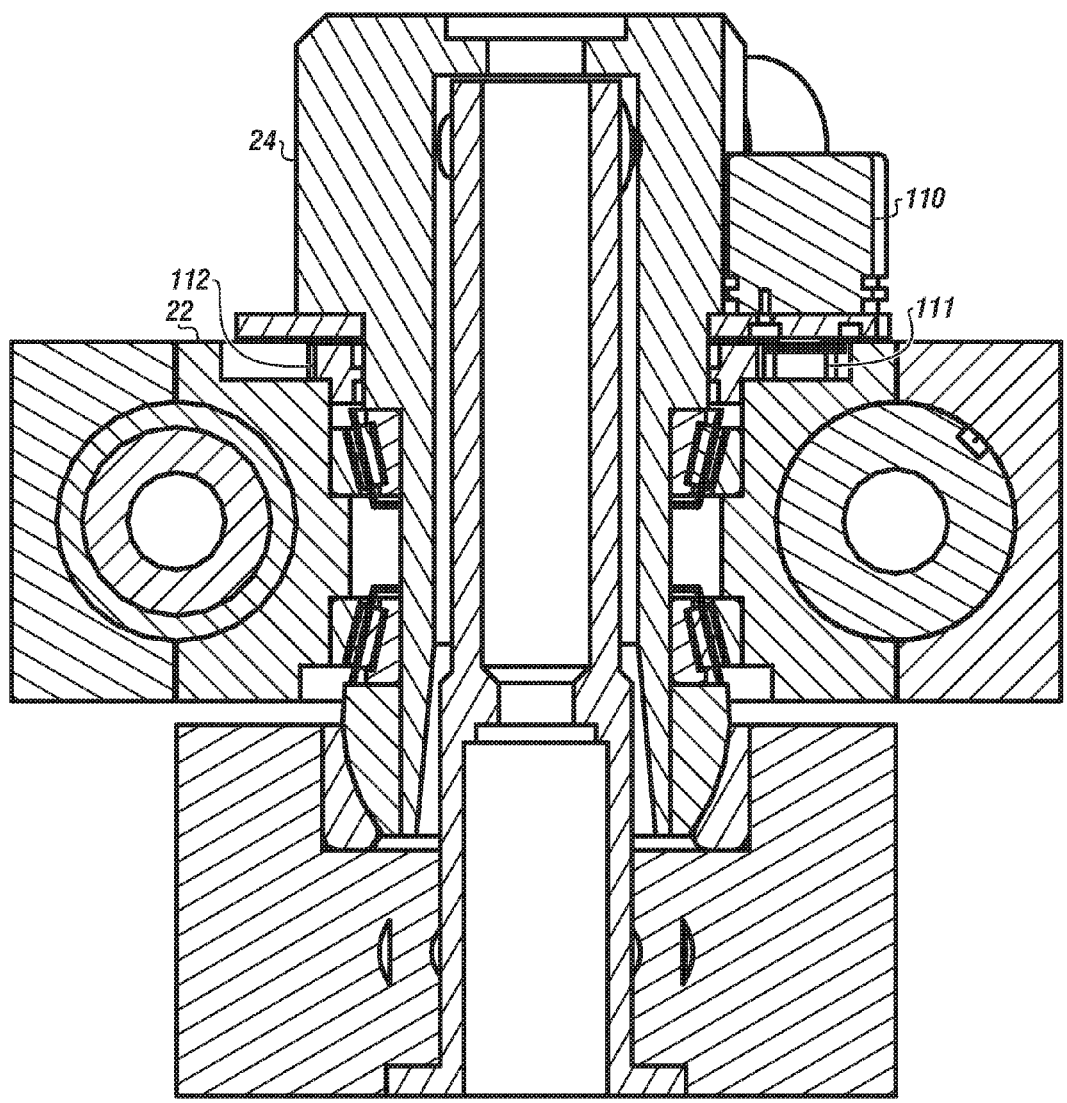

FLATNESS INSPECTION SPIDER

CROSS REFERENCE TO RELATED APPLICATION

The current application claims priority to and the benefit of U.S. Provisional Patent Application Ser. No. 62/136,013 filed on Mar. 20, 2015, entitled "FLATNESS INSPECTION SPIDER". This reference is hereby incorporated in its entirety.

FIELD

The current embodiments generally relate to a flatness inspection tool for use in flanges and pipes.

BACKGROUND

A need exists for an easy to install inspection tool for pipes and flanges that tests for flatness, which can be light weight with a quick connect and quick release mechanism and does not need cranes or tools to install and operate.

The present embodiments meet these needs.

BRIEF DESCRIPTION OF THE DRAWINGS

The detailed description will be better understood in conjunction with the accompanying drawings as follows:

FIGS. 3A-3C show views of the fixed base according to one or more embodiments.

FIG. 4 depicts a detailed view of the load displacement shaft according to one or more embodiments.

FIG. 5 shows a top view of the rotating inspection head with alignment head and draw bar according to one or more embodiments.

FIG. 9 depicts a cross section view of the head assembly with the rotating inspection head secured to the fixed base of FIG. 8 according to one or more embodiments.

Figure 1:
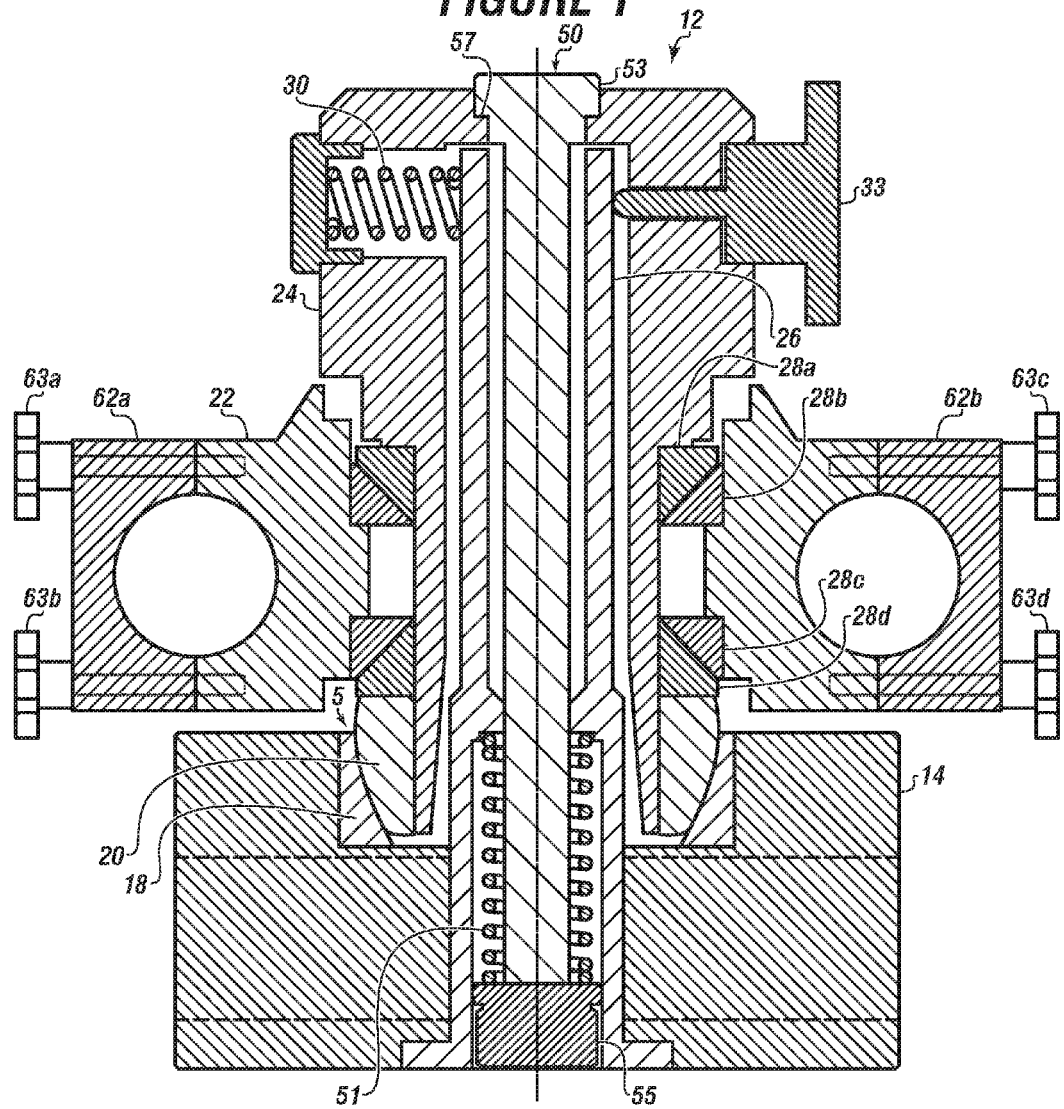
FIG. 1 depicts a cross section of a head assembly with a rotating inspection head secured to a fixed base according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The current embodiments generally relate to a flatness inspection tool for use in flanges and pipes.

A benefit of the invention is that the flatness inspection spider can be operated by hand without the need for a wrench or other tools.

Another benefit of the invention is that the flatness inspection spider can be used on a wide range of flanges and pipe of assorted sizes.

A benefit of the invention is that the flatness inspection spider is very fast to install and remove using quick connect and quick disconnect features.

A benefit of the invention is that the flatness inspection spider is light weight, does not need to be lifted with an overhead crane, and have only a few moving parts.

A benefit of the invention is that the device, when it needs to be installed 120 feet in the air for inspection, no longer needs a $15,000-$20,000 a day crane to perform the inspection with the tool, instead this device costs less money to lift and inspect and no crane is needed.

The device saves on fuel because no special crane needs to be imported to the job site to lift the device for performing the inspection.

The flatness inspection spider is light weight and can weigh from 45 pounds to 100 pounds, which can be carried by only two men and does not require a crane for installation or removal.

The term "adjustable foot" as used herein can refer to a component that can be a threaded rod in embodiments. The adjustable feet can be in various lengths from 3 inches to 24 inches. By being threaded using a threaded anodized aluminum knurl the adjustable foot can extend to different lengths to contact different sized inspection surfaces without the need for any special mounting tools. The threaded anodized aluminum knurl can have an anti-rotation pin to prevent the adjustable foot from rotating as it is being adjusted. In embodiments, a precision ball bearing can be mounted between the threaded anodized aluminum knurl and foot locking shaft enabling a smooth extension or retraction of the adjustable foot.

The term "adjustable x-axis biasing means" as used herein can refer to a spring or another load biasing means, such as a gas shock absorber. The spring can range in deflection load depending on the size of the overall tool.

The term "adjustable y-axis biasing means" as used herein can refer to a spring or another load biasing means, such as a gas shock absorber. The spring can range in deflection load depending on the size of the overall tool.

The term "alignment head" as used herein can refer to a portion of the head assembly that retains both an x-axis adjustment screw and an x-axis spring. In embodiments, the alignment head can have both an x-axis adjustment screw and a y-axis adjustment screw. If a y-axis adjustment screw is used, a y-axis spring can also be installed in the alignment head. In embodiments, at least a pair of spaced apart angular contact bearings can be positioned around the alignment head and positioned between the alignment head and the rotating inspection head. The alignment head can additionally provide a seat for a draw bar. In embodiments, the alignment head can be aluminum.

The term "angular contact bearing" as used herein can refer to pairs of contact bearings, such as a pair of two or a pair of four bearings. In embodiments, the bearings can have from a 2 inch inner diameter to a 4 inch inner diameter. The bearings can be carbon steel, carbide or another bearing material that does not deform when pressure is applied when a nut is adjusted against a spring.

The term "counterweight tubular" as used herein can refer to a hollow tube that connects through the rotating inspection head and contains a carbon steel insert that can extend or retract in the rotating inspection head to add or subtract weight as needed to balance the overall tool for operation on an inspection surface.

The term "digital indicator" as used herein can refer a device that takes units of measurements from the inspection surface and used in place of a conventional indicator. In embodiments, the digital indicator can be in a wireless or wired connection with a remote processor.

The term "draw bar" as used herein can refer a partially threaded rod that can be solid. The draw bar can range in size from 6 inches to 12 inches and be from $3/8^{th}$ inch to 1 inch in outer diameter. In embodiments, the draw bar can be made from carbon steel. In embodiments, the drawbar can have an enlarged head and a seat. The seat can engage a seat area of the alignment head.

The term "encoder" as used herein can refer to a position monitoring device that can enable remote measuring of an inspection surface by providing a wired or wireless communication with the remote processor. The encoder can signal when a value on an inspection surface needs to be recorded, such as from one or more preset locations.

The term "fastener" as used herein can refer to one of several devices including: a hand knob connected to a screw or threaded rod, a knurl knob, or a hex head screw.

The term "fixed base" as used herein can refer to a component of the head assembly which can attach to the removable foot. In embodiments, the fixed base can be aluminum. The fixed base can contain four springs to eight springs. Each spring can push against a ball that engages a groove on an adjustable foot or leg.

The term "foot extension" as used herein can refer to a tubular that can provide an additional tubing length when connected to the adjustable foot, enabling the tool to operate on larger devices flexibly and without the need for special training or tools.

The term "head assembly" as used herein can refer to the part of the flatness inspection spider which can connect to the removable foot for allowing axial and radial inspection of the inspection surface by one device.

The term "holder" as used herein can refer to a tab to assist in initial alignment of the tool into a part to be inspected.

The term "indicator" as used herein can refer to a gauge, a digital display, or electronic feedback which can transfer to a computer with a processor and a data storage via a wireless or wired network. The indicator contacts the inspection surface and provides a reading on flatness of the inspection surface.

The term "data storage" as used herein refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "inspection tubular" as used herein can refer a rod which can be hollow and can be made from a lightweight metal, such as aluminum or titanium, which can be from 20 inches to 120 inches in length, and have an outer diameter from 1.5 inches to 4 inches.

The term "linear bearing" as used herein can refer to a bearing mounted to the rail. In embodiments, a series of ball bearings can be used in a continuous circular pattern around the rail forming the linear bearing and enabling a smooth sliding engagement between the linear bearing and the rail.

The term "load displacement shaft" as used herein can refer to a carbon steel rod, which can be hollow. In embodiments, the load displacement shaft can have a flange on one end and a spring seat on the same end. The shaft can be from 5 inches to 20 inches long. The outer diameter of the shaft can be from 1 inch to 3 inches.

The term "network" as used herein can refer to at least one of: a cellular network, a satellite network, a global communication network, such as the internet, a local area network, a virtual private network, a wide area network, a similar network known in the industry, and combinations thereof.

The phrase "a radial sweep and an axial sweep" as used herein can refer to a radial sweep that is a movement over the inspection surface which is a measurement of flatness that starts from a known point and moves outward and an axial sweep that is a movement over the inspection surface that is a measurement of flatness that circles the inspection surface.

The term "rail" as used herein can refer to a precision linear guide rail that fastens or similarly mounts to the inspection tubular. The rail can have a length from 12 inches to 30 inches. In embodiments, the rail can be a hardened bearing steel. The rail can be shaped to have multiple load bearing surfaces so that when the rail is rotating, the rail can support a load no matter what orientation, from 2 degrees to 359 degrees.

The term "retaining cap" as used herein can refer to a holding device or clamping assembly that secures the counter weight tubular and the inspection tubular to a desired position on the tool.

The term "rotating inspection head" as used herein can refer to the portion of the head assembly that rotates 360 degrees repeatedly, namely sequentially. The rotating inspection head rests on contact bearings that allow the rotation. The rotating inspection head can also move on an x-axis and a y-axis because of the engagement with the spherical seated cup and cone bearing, which can be pressed into the fixed base allowing the head assembly to moves as one piece.

The term "spherical seated cup and cone bearing" as used herein can refer to a ball shaped seat, which can allow movement of the head assembly in both the x-axis and the y-axis simultaneously. In embodiments, the ball shaped seat can be a precision adjustable connection between the fixed base and the alignment head.

The term "spider" as used herein can refer to a device with adjustable feet. The spider can have 4 legs, 6 legs, 8 legs, or 12 legs.

The term "tubular extension" as used herein can refer to a rod or a hollow tubular that can attach to the inspection tubular or the counterweight tubular, which can allow the tool to be adjustable and inspect small and large diameter tubulars without the need for special tools or special training by an operator.

The term "x-axis adjustment screw" as used herein can refer to a screw that can be turned to adjust the position of an object into which it fits.

The term "y-axis adjustment screw" as used herein can refer to a screw that can be turned to adjust the position of an object into which it fits.

Turning now to the Figures, FIG. 1 depicts a cross section of a head assembly with a rotating inspection head secured to a fixed base according to one or more embodiments.

The head assembly 12 of the flatness inspection spider can have a fixed base 14.

A bearing assembly 5, which can be referred to herein as "a cup and a cone" can be formed from a cup 18 in the fixed base 14 and a cone 20 that can fit into the cup 18. The cone 20 can be within the rotating inspection head 22.

In embodiments, the bearing assembly 5 can be referred to herein as "a spherical seated cup and cone bearing".

The head assembly 12 can have the rotating inspection head 22 disposed over the cup 18 and the cone 20.

The head assembly 12 can have an alignment head 24 centrally mounted through the rotating inspection head 22 seated into the cup 18 and the cone 20.

The head assembly 12 can have a load displacement shaft 26 extending centrally through the alignment head 24, the fixed base 14, the cup 18, the cone 20, and the rotating inspection head 22.

The head assembly 12 can have a plurality of angular contact bearings 28a, 28b, 28c, and 28d positioned around the alignment head 24, and positioned between the alignment head 24 and the rotating inspection head 22.

The alignment head 24 can have an adjustable x-axis biasing means 30 engaging the load displacement shaft 26 along an x-axis, which can be configured to provide a variable load on the load displacement shaft 26 along the x-axis.

The alignment head 24 can have an x-axis adjustment screw 33 threaded through the alignment head 24 opposing the adjustable x-axis biasing means 30. The x-axis adjustment screw can contact a seat that is a flat surface to prevent galling of identical metal to metal connections and allow free movement across the x-axis and the y-axis of the alignment head.

A draw bar 50 can be mounted through the alignment head 24 and through the load displacement shaft 26 to cause the alignment head 24 to stay within the rotating inspection head 22. A nut 55 can be tightened against a spring 51, enabling the spring 51 to rest against the load displacement shaft 26.

In embodiments, the drawbar can have an enlarged head 53 and a seat 57.

In embodiments, the spring 51 can be a tensioning spring and can be mounted opposite the draw bar 50 for positioning the draw bar 50 in the head assembly 12.

The head assembly 12 can have a first retaining cap 62a and a second retaining cap 62b.

The first retaining cap 62a and the second retraining cap 62b can secure an inspection tubular, a counter weight tubular, or at least one tubular extension to the rotating inspection head 22.

The first retaining cap 62a can have at least one retaining cap fastener 63a and 63b for securing the first retaining cap 62a to the rotating inspection head 22. The second retaining cap 62b can have at least one retaining cap fastener 63c and 63d for securing the second retaining cap 62b to the rotating inspection head 22. In other embodiments more retaining cap fasteners can be used.

Figure 2:
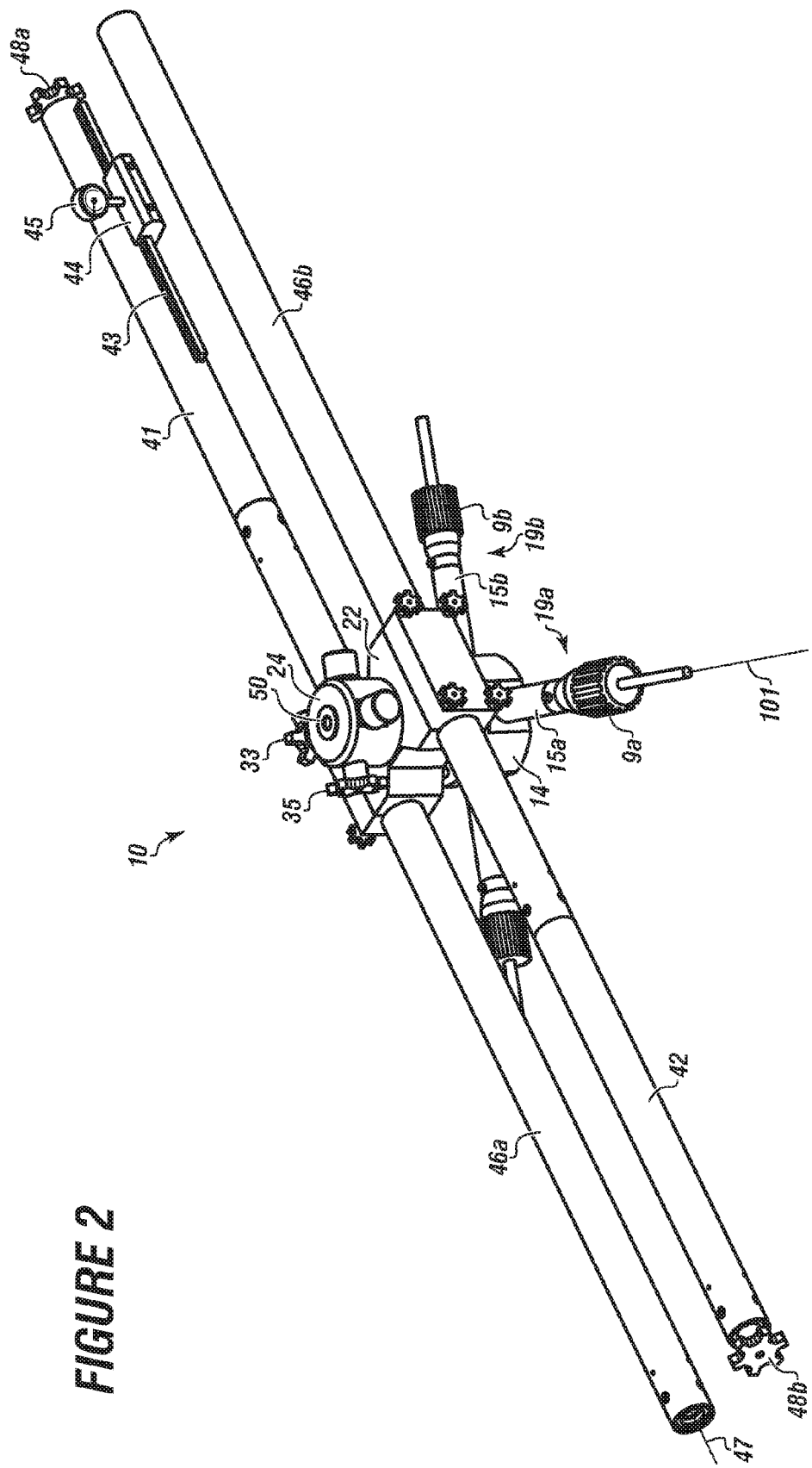
FIG. 2 depicts a perspective view of the flatness inspection spider according to one or more embodiments.

FIG. 2 depicts a perspective view of the flatness inspection spider according to one or more embodiments.

The flatness inspection spider 10 can have at least one adjustable foot 19a and 19b.

The alignment head 24 can be connected to the fixed base 14 using the draw bar 50.

The at least one adjustable foot 19a can have a foot longitudinal axis 101.

The at least one adjustable foot 19a and 19b can be extended or retracted in length by rotating a bearing in the at least one adjustable foot 19a and 19b by turning an at least one adjustment knob 9a and 9b. The at least one adjustment knob 9a and 9b enables turning to lengthen or retract the at least one adjustable foot 19a and 19b by a human hand without need for any additional tool.

The flatness inspection spider 10 can have at least one foot extension 15a and 15b.

In embodiments, the at least one foot extension 15a and 15b can extend from the fixed base 14 on one end of the flatness inspection spider 10 and support the at least one adjustable foot 19a and 19b on the other end of the flatness inspection spider 10. The at least one foot extension 15a can support the at least one adjustable foot 19a and the at least one foot extension 15b can support the at least one adjustable foot 19b.

An inspection tubular 41 is shown mounted through the rotating inspection head 22 having a tubular longitudinal axis 47.

The flatness inspection spider 10 can have at least one tubular extension 46a and 46b.

In embodiments, the at least one tubular extension 46a can connect to the inspection tubular 41. In further embodiments, the at least one tubular extension 46b can engage a counter weight tubular 42. The at least one tubular extension 46a and 46b can enable the flatness inspection spider 10 to be quickly adapted to a variety of openings for inspection.

In embodiments, at least one first fastener 48a can be used to secure the inspection tubular 41 to the at least one tubular extension 46a. The fastener is shown as a knob.

In embodiments, at least one second fastener 48b can be used to secure the counter weight tubular 42 to the at least one tubular extension 46b. The fastener is shown as a knob.

In embodiments, an indicator 45 can be mounted to the inspection tubular 41.

In embodiments, the indicator 45 can be mounted to a linear bearing 44 that can slide on a rail 43, which can be mounted on the inspection tubular 41 in parallel to the tubular longitudinal axis 47.

In embodiments, the at least one tubular extension 46a and 46b can be secured to the rotating inspection head 22.

In further embodiments, the indicator 45 can be a dial indicator for determining flatness of a flange.

The x-axis adjustment screw 33 and a y-axis adjustment screw 35 are shown.

FIG. 3A depicts a detailed perspective view of the fixed base according to one or more embodiments.

The fixed base 14 can have at least one fixed base locking port 8a and 8b, which can receive the at least one adjustable foot or the at least one foot extension.

The at least one fixed base locking port 8a and 8b can have at least one quick connect and quick release mechanism 70a-70d enabling quick connect or disconnect of either the at least one adjustable foot or the at least one foot extension.

FIG. 3B depicts a top cross sectional view of the fixed base showing the cross sectional cut lines A-A.

The fixed base 14 is shown with four fixed base locking ports 8a-8d.

FIG. 3C depicts a side cross sectional view along cut lines A-A of FIG. 3B.

The fixed base 14 is shown with the at least one quick connect and quick release mechanism can be made up of at least one screw 171a and 171c, at least one spring 172a and 172c which can push at least one ball 173a and 173c against a groove on the at least one adjustable foot or a groove on the at least one foot extension. The at least one fixed base locking port 8a and 8c is also shown.

FIG. 4 depicts a detailed view of the load displacement shaft according to one or more embodiments.

The load displacement shaft 26 can be a hollow shaft with flat portions 29a and 29b for engaging an adjustable y-axis biasing means and the adjustable x-axis biasing means.

FIG. 5 depicts a top view of the alignment head and draw bar according to one or more embodiments.

The alignment head 24, the draw bar 50, the adjustable x-axis biasing means 30 and the adjustable y-axis biasing means 32 are shown.

The alignment head 24 is shown with the adjustable x-axis biasing means 30 engaging the load displacement shaft 26 along the x-axis 1000 and configured to provide a variable load on the load displacement shaft 26 along the x-axis.

The adjustable y-axis biasing means 32 can engage the load displacement shaft 26 along the y-axis 1002 and configure to provide a variable load on the load displacement shaft along the y-axis.

The x-axis adjustment screw 33 can be threaded through the load displacement shaft 26 opposite the adjustable x-axis biasing means 30.

The y-axis adjustment screw 35 can be threaded through the load displacement shaft 26 opposite the adjustable y-axis biasing means 32.

Figure 6:
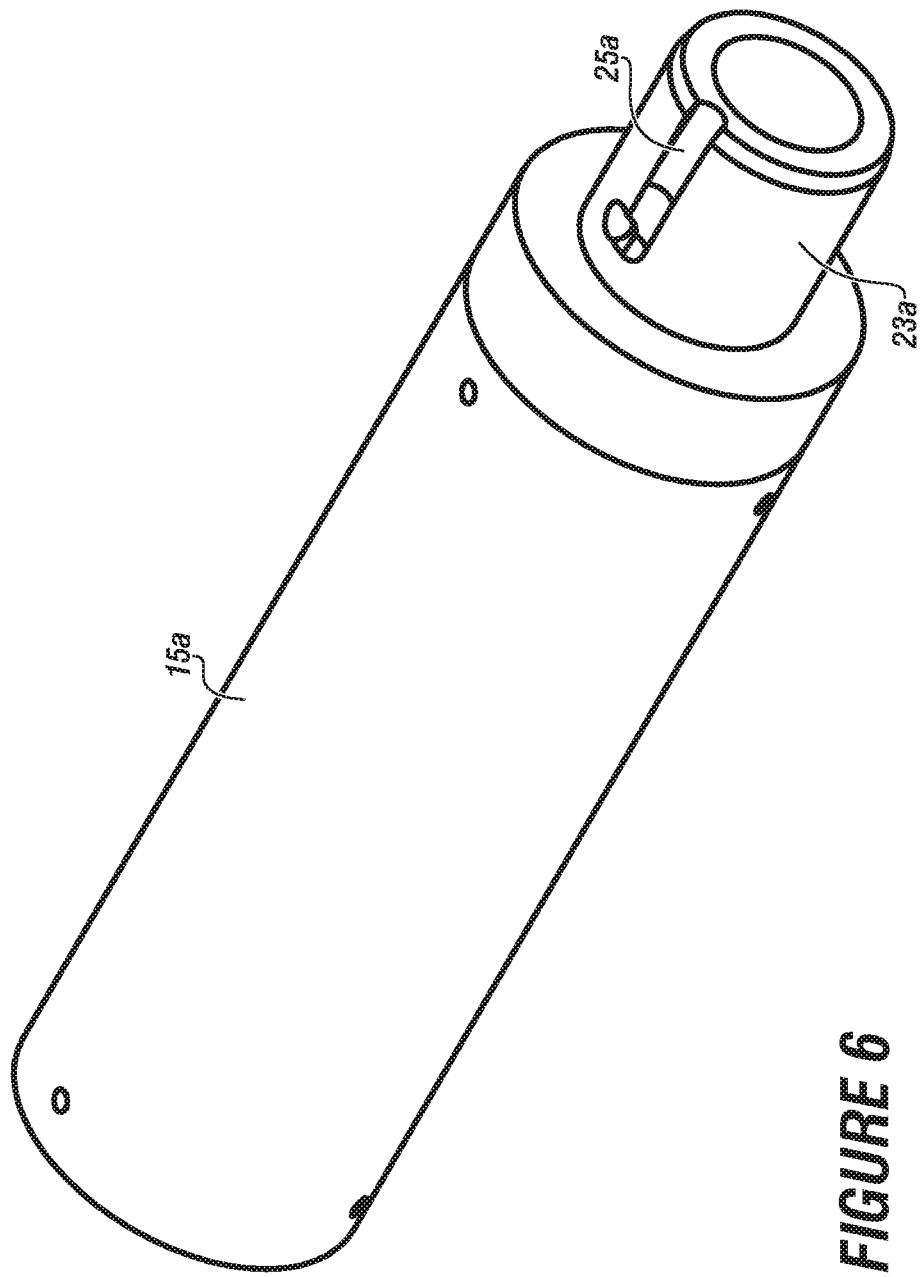
FIG. 6 is a detailed view of one end of a foot extension according to one or more embodiments.

FIG. 6 depicts a detailed view of one end of the at least one foot extension according to one or more embodiments.

The at least one foot extension 15a can have a locking shaft 23a. In embodiments, the at least one adjustable foot can have a locking shaft.

A retaining slot 25a can be disposed on the at least one foot extension 15a. In embodiments, the retaining slot can be disposed on the at least one adjustable foot. The retaining slot 25 can enable the at least one foot extension to engage the quick connect and quick release mechanism that can be secured to the at least one foot extension, the at least one adjustable foot, or to the fixed base.

In embodiments, the at least one foot extension can be hollow.

Figure 7:
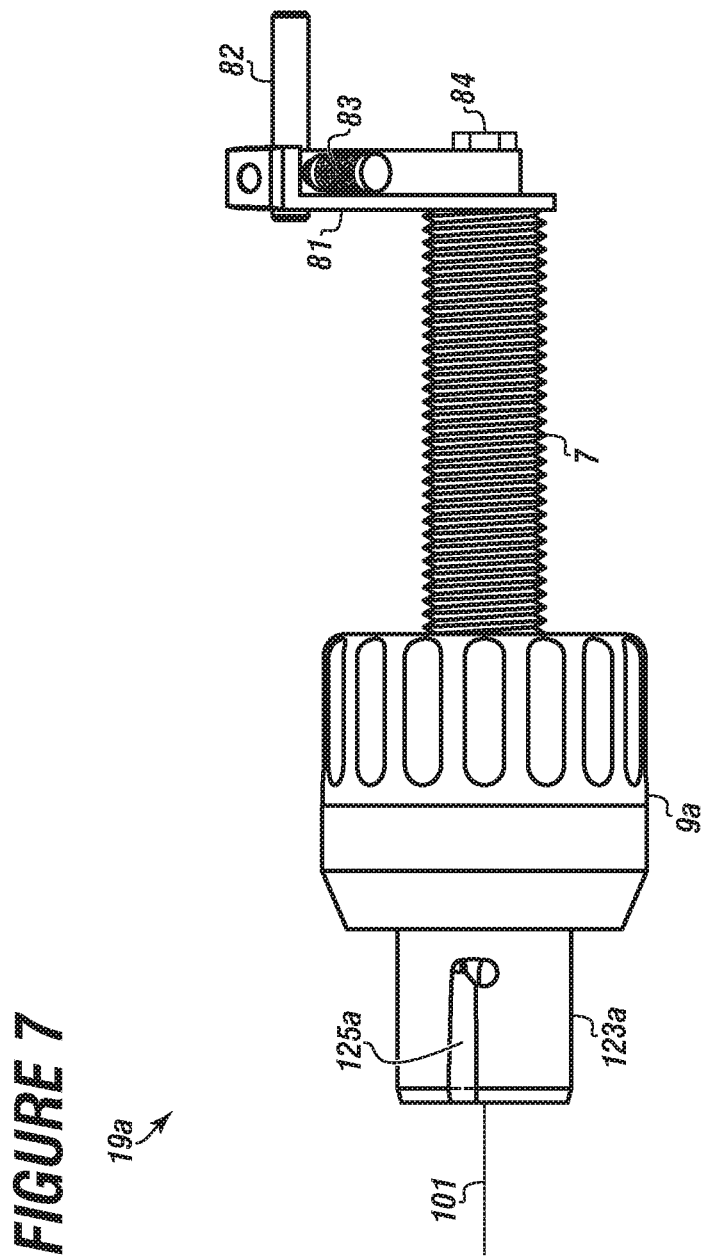
FIG. 7 is a side view of an adjustable foot according to one or more embodiments.

FIG. 7 depicts a side view of the at least one adjustable foot according to one or more embodiments.

The at least one adjustable foot 19a is shown with the foot longitudinal axis 101.

The at least one adjustable foot 19a can be extended or retracted in length by rotating at least one adjustable knob 9a on the at least one adjustable foot 19a without the need for any additional tool.

The at least one adjustable foot 19a can have a foot extension rod 7 centrally extending from the at least one adjustable foot opposite a foot locking shaft 123a. The foot locking shaft 123 can support a foot retaining slot 125a.

The at least one adjustable foot 19a can have a holder 81 mounted to the foot extension rod 7.

The at least one adjustable foot 19a can have a retractable dowel 82 mounted to the holder 81.

The retractable dowel 82 can extend parallel to the foot longitudinal axis 101 of the at least one adjustable foot.

The at least one adjustable foot 19a can have a knurl thumb screw 83 for loosening or tightening the retractable dowel 82.

The at least one adjustable foot 19a can have a bolt 84 for securing the holder 81 to the foot extension rod 7.

The retractable dowel 82 can be used to locate the flatness inspection spider to a fixed depth in a component for flatness inspection.

The foot locking shaft 123a with the foot retaining slot 125a can be used to allow the at least one adjustable foot to quick connect and quick disconnect from either the at least one foot extension, the at least one adjustable foot, or the fixed base.

To install the flatness inspection spider, a user can determine the size of an opening usable for the inspection. In embodiments, the installation of the flatness inspection spider can include reference to FIG. 1 through FIG. 7.

A user can determine if the at least one adjustable foot 19a and 19b can be used, or if additional foot extensions must be used with the at least one adjustable foot to enable the flatness inspection spider 10 to contact the falls of the component to be inspected.

Assuming no foot extensions are needed, a user can insert the at least one adjustable foot 19a and 19b into the fixed base 14 of the head assembly 12, which can be preassembled.

The retractable dowel 82 mounted to the holder 81 with the bolt 84 and can be secured to the foot extension rod 7 using the knurl thumb screw 83 to lock the retractable dowel 82 in place.

The flatness inspection spider 10 can be installed in the component being inspected.

The at least one adjustment knob 9a and 9b can be rotated by hand.

The rotation of the at least one adjustment knob 9a and 9b can cause the foot extension rod 7 to extend until the bolt 84 makes contact with the component to be inspected.

The inspection tubular 41 can be mounted through the rotating inspection head 22.

Retaining cap fasteners 63a and 63b can be tightened causing the first retaining cap 62a to secure around the inspection tubular 41.

An indicator 45 can be installed on the inspection tubular 41, such as on the linear bearing 44.

The rotating inspection head 22 can then be rotated manually allowing the indicator 45 to make contact radially with the component to be inspected.

A user can take at a least six point reading or an eight point reading on the component to be inspected to determine flatness.

In embodiments, the angularity of the surface can be inspected by allowing the linear bearing 44 to slide on the rail 43 mounted on the inspection tubular 41 without rotating the rotating inspection head 22.

In embodiments, if the flatness inspection spider is not large enough for a component to be inspected for flatness, the at least one foot extension 15a and 15b can be used.

To construct the flatness inspection spider, the cone 20 and the cup 18, can be installed into the fixed base 14.

In embodiments, the cone 20 and the cup 18 can be referred to as the cone and cup bearing or the bearing assembly.

The angular contact bearings 28a-28d can be pressed into the rotating inspection head 22.

The alignment head 24 can be pressed through the angular contact bearings 28a-28d.

The cup 18 can be inserted onto the alignment head 24.

The load displacement shaft 26 can be inserted into the fixed base 14.

The draw bar 50 can be inserted through the alignment head 24 into the load displacement shaft 26.

The spring 51 can be installed over the draw bar 50 until the spring 51 touches a shoulder of the load displacement shaft 26. The spring 51 can be secured with the nut 55 to a specification indicated tension.

The adjustable x-axis biasing means 30 can be installed, which can engage the load displacement shaft 26 along the adjustable x-axis and can be configured to provide a variable load on the load displacement shaft 26 along the x-axis.

An adjustable y-axis biasing means 32 can be installed, which can engage the load displacement shaft 26 along the y-axis and can be configured to provide a variable load on the load displacement shaft along the y-axis.

The x-axis adjustment screw 33 can then be threaded through the alignment head 24 opposing the adjustable x-axis biasing means 30.

The y-axis adjustment screw 35 can then be threaded through the alignment head 24 opposite the adjustable y-axis biasing means 32.

The inspection tubular 41 can be mounted through the rotating inspection head 22.

The rail 43 can be mounted to the inspection tubular 41 on an end opposite the rotating inspection head 22 and parallel to the tubular longitudinal axis 47.

The linear bearing 44 can be slidably mounted to the rail 43.

The indicator 45 can be mounted to the linear bearing 44.

The counter weight tubular 42 can be slidably mounted through the rotating inspection head 22 opposite and parallel to the inspection tubular 41.

The at least one first fastener 48a can be secured through inspection tubular 41 to the at least one tubular extension 46a and 46b.

The at least one second fastener 48b can be secured through the counter weight tubular 42 to the at least one tubular extension 46a and 46b.

The first retaining cap 62a can secure the inspection tubular 41 to the rotating inspection head 22.

The second retaining cap 62b can secure the counter weight tubular 42 to the rotating inspection head 22.

At least one retaining cap fastener 63a-63d can be used to secure the first retaining cap 62a and the second retaining cap 62b to the rotating inspection head 22.

The fixed base 14 can have at least one fixed base locking port 8a and 8b.

At least one fixed base locking port 8a-8d can be installed in the at least one adjustable foot 19a and 19b, the at least one foot extension 15a and 15b, or combinations thereof.

If the at least one foot extension 15a and 15b is installed in the at least one fixed base locking port 8a-8d, then the at least one foot extension 15a and 15b can also lock to the at least one adjustable foot 19a and 19b.

In embodiments, the at least one fixed base locking port 8a-8d can have at least one screw 171a and 171c with at least one spring 172a and 172c, at least one ball 173a and 173c, that is, a biased detent, for engaging a retaining slot 25a or foot retaining slot 125a to secure the at least one adjustable foot 19a and 19b to the at least one foot extension 15a and 15b or the at least one adjustable foot 19a and 19b to the fixed base 14 in a quick connect and quick disconnect configuration.

The at least one adjustable foot 19a and 19b whether connected to the at least one foot extension 15a and 15b or not, can extend from the fixed base 14 and can contact an inspection surface.

The at least one adjustable foot 19a and 19b can be extended or retracted longitudinally by rotating the at least one adjustment knob 9a and 9b on the at least one adjustable foot 19a and 19b by hand without need for any additional tools.

Figure 8:
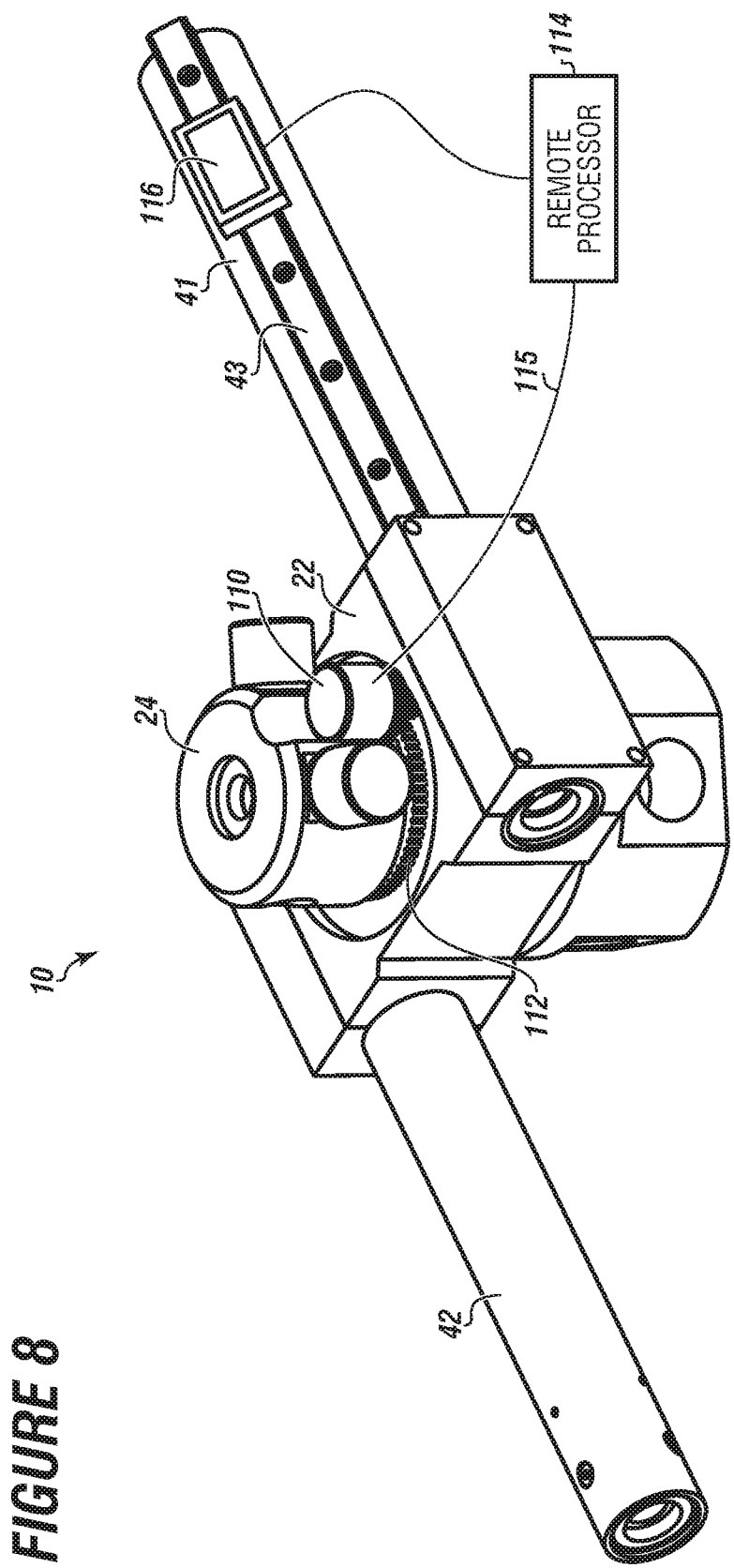
FIG. 8 depicts a perspective view of the flatness inspection spider according to one or more embodiments.

FIG. 8 depicts a perspective view of the flatness inspection spider according to one or more embodiments.

The flatness inspection spider 10 can an encoder 110 mounted to the alignment head 24 according to one or more embodiments.

The encoder 110 can be used for relaying positioning signals by engaging a rotating connecting device 112, shown in this embodiment as a gear, wherein the rotating connecting device can be mounted between the rotating inspection head 22 and the alignment head 24.

The encoder 110 can be in communication with a remote processor 114, wherein the remote processor can be configured to provide a plurality of preset locations in degrees 115 for the rotating inspection head as the rotating inspection head rotates through a 360 degree rotation.

In embodiments, the remote processor can be a computer, a laptop, a cellular phone, a smart phone, a tablet, or a similar device with data storage that is capable of at least two way communications and processing of data.

In embodiments, the remote processor can contain a power supply, such as a battery.

In embodiments, the encoder can be in communication with a digital indicator 116 mounted to the rail 43 on the inspection tubular 41 opposite the counterweight tubular 42 for transmitting a flatness reading to the remote processor 114 for each preset location in degrees.

In embodiments, the digital indicator can be in wireless connection or communication with the remote processor. However, in other embodiments, the digital indicator can be in wired connection or communication the remote processor.

The remote processor 114 can be configured to compute a flatness of an inspection surface digitally.

In embodiments, a moving loop style belt can be used to encircle the rotating connecting device and the encoder to ensure a snug fit and a secure engagement of the encoder with the rotating connecting device. In embodiments, the moving loop style belt can be made from an elastomeric material.

In embodiments, the plurality of preset locations can be groupings of 4 preset locations, 6 preset locations, 8 preset locations 12 preset locations, or 16 preset locations per a 360 rotation.

FIG. 9 depicts a cross section view of the head assembly with the rotating inspection head secured to the fixed base of FIG. 8 according to one or more embodiments.

The head assembly 12 can have an alignment head 24 centrally mounted through the rotating inspection head 22.

The rotating connecting device 112 is shown adjacent the rotating inspection head 22

The encoder 110 can have an encoder gear 111.

While these embodiments have been described with emphasis on the embodiments, it should be understood that within the scope of the appended claims, the embodiments might be practiced other than as specifically described herein.

What is claimed is:

1. A flatness inspection spider for inspecting flatness of an inspection surface comprising:
   a. a head assembly comprising:
      (i) a fixed base;
      (ii) a rotating inspection head;
      (iii) a bearing assembly pressed into the fixed base to the rotating inspection head allowing the head assembly to moves as one piece;
      (iv) an alignment head extending above and centrally mounted through the rotating inspection head that seats into the bearing assembly;
      (v) a load displacement shaft extending centrally through the rotating inspection head to the fixed base; and
      (vi) a plurality of angular contact bearings positioned around the alignment head, between the alignment head and the rotating inspection head;
   b. at least one adjustable foot, wherein the at least one adjustable foot extends from the fixed base to contact the inspection surface, the at least one adjustable foot having a foot longitudinal axis, the at least one adjustable foot configured to extend or retract in length without a need for any additional tools;
   c. an inspection tubular mounted through the rotating inspection head, the inspection tubular having a tubular longitudinal axis; and
   d. an indicator mounted to the inspection tubular for providing readings on flatness of the inspection surface.

2. The flatness inspection spider of claim 1, comprising a draw bar mounted through the alignment head and within the load displacement shaft to cause the alignment head to stay within the rotating inspection head.

3. The flatness inspection spider of claim 2, comprising a spring mounted opposite the draw bar for positioning the draw bar in the head assembly with a nut.

4. The flatness inspection spider of claim 1, wherein the bearing assembly comprises a cone that fits into a cup.

5. The flatness inspection spider of claim 1, further comprising:
   a. an adjustable x-axis biasing means engaging the load displacement shaft along an x-axis and configured to provide a variable load on the load displacement shaft along the x-axis; and
   b. an adjustable y-axis biasing means engaging the load displacement shaft along an y-axis and configured to provide a variable load on the load displacement shaft along the y-axis.

6. The flatness inspection spider of claim 5, further comprising an x-axis adjustment screw threaded through the alignment head opposite the adjustable x-axis biasing means and a y-axis adjustment screw threaded through the alignment head opposite the adjustable y-axis biasing means.

7. The flatness inspection spider of claim 1, further comprising:
   a. a counter weight tubular slidably mounted through the rotating inspection head and parallel to the inspection tubular;
   b. a rail mounted to the inspection tubular on an end opposite the rotating inspection head and parallel to the tubular longitudinal axis; and
   c. a linear bearing slidably mounted to the rail; and
      wherein the indicator is mounted to the linear bearing mounted to the rail mounted to inspection tubular enabling both a radial sweep and an axial sweep of the inspection surface.

8. The flatness inspection spider of claim 7, comprising at least one tubular extension engaging the inspection tubular or the counter weight tubular enabling the flatness inspection spider to be quickly adapted to a variety of openings for inspection, wherein at least one first fastener secures the inspection tubular to the at least one tubular extension, and wherein at least one second fastener secures the counter weight tubular to the at least one tubular extension.

9. The flatness inspection spider of claim 7, comprising a first retaining cap and a second retaining cap, the first retaining cap securing the inspection tubular to the rotating inspection head, the second retaining cap securing the counter weight tubular to the rotating inspection head, wherein the first retaining cap and the second retaining cap have at least one retaining cap fastener to secure the first retaining cap and the second retaining cap to the rotating inspection head.

10. The flatness inspection spider of claim 1, wherein the indicator is a dial indicator for determining flatness of a flange.

11. The flatness inspection spider of claim 1, further comprising at least one foot extension extending from the fixed base on one end and supporting the at least one adjustable foot on the other end.

12. The flatness inspection spider of claim 11, wherein the at least one foot extension has a locking shaft with a retaining slot allowing the at least one foot extension to quick connect and quick disconnect from either the at least one foot extension or from the fixed base.

13. The flatness inspection spider of claim 12, wherein the at least one foot extension comprises at least one fixed base locking port and the at least one fixed base locking port comprises at least one quick connect and quick release mechanism for engaging the retaining slot to secure the at least one adjustable foot to the at least one foot extension.

14. The flatness inspection spider of claim 13, wherein the at least one quick connect and quick release mechanism enables a quick connect and quick disconnect from either the at least one adjustable foot or the at least one foot extension.

15. The flatness inspection spider of claim 11, wherein the at least one adjustable foot has a foot locking shaft with a foot retaining slot allowing the at least one adjustable foot and to quick connect and quick disconnect from either the at least one foot extension or from the fixed base.

16. The flatness inspection spider of claim 15, wherein the at least one adjustable foot further comprising:
   a. a foot extension rod centrally extending from the at least one adjustable foot opposite the foot locking shaft;
   b. a holder mounted to the foot extension rod;
   c. a retractable dowel mounted to the holder, the retractable dowel extending parallel to the foot longitudinal axis of the at least one adjustable foot;
   d. a knurl thumb screw for loosening or tightening the retractable dowel; and
   e. a bolt for securing the holder to the foot extension rod; and
      wherein the retractable dowel is used to locate the flatness inspection spider to a fixed depth in a component for flatness inspection.

17. The flatness inspection spider of claim 1, further comprising an encoder mounted to the alignment head for relaying positioning signals by engaging a rotating connecting device, wherein the connecting device is mounted between the rotating inspection head and the alignment head, wherein the encoder is in communication with a remote processor, the remote processor configured to provide a plurality of preset locations in degrees for the rotating inspection head as the rotating inspection head rotates through a 360 degree rotation wirelessly or in a wired configuration, and wherein the encoder is in communication with a digital indicator mounted to the rail on the inspection tubular for transmitting a flatness reading to the remote processor for each preset location in degrees, the remote processor configured to compute flatness of the inspection surface digitally.

18. The flatness inspection spider of claim 17, wherein plurality of preset locations are groupings of 4 preset locations, 6 preset locations, 8 preset locations 12 preset locations, or 16 preset locations per 360 rotation.

\* \* \* \* \*